United States Patent [19]

Heyland et al.

[11] Patent Number: 4,965,085
[45] Date of Patent: * Oct. 23, 1990

[54] PREPARATION OF A SEASONING

[75] Inventors: Sven Heyland, Weiningen; Karl Rolli, Winterthur; David Röschli, Pfungen; Jaak J. Sihver, Gutenswil, all of Switzerland

[73] Assignee: Nestec S.A., Vevey, Switzerland

[*] Notice: The portion of the term of this patent subsequent to Nov. 7, 2006 has been disclaimed.

[21] Appl. No.: 417,889

[22] Filed: Oct. 26, 1989

Related U.S. Application Data

[63] Continuation-in-part of Ser. No. 168,426, Mar. 15, 1988, Pat. No. 4,879,130.

[30] Foreign Application Priority Data

Apr. 6, 1987 [CH] Switzerland .......................... 1317/87

[51] Int. Cl.$^5$ ............................................. A23L 1/231
[52] U.S. Cl. ..................................................... 426/533
[58] Field of Search ......................................... 426/533

[56] References Cited

U.S. PATENT DOCUMENTS

| | | |
|---|---|---|
| 3,711,301 | 1/1973 | Asogawa et al. . |
| 3,930,044 | 12/1975 | vande Rovaart . |
| 3,930,045 | 12/1975 | Mosher . |
| 4,060,645 | 11/1977 | Risler et al. . |
| 4,189,505 | 2/1980 | Mosher . |
| 4,590,081 | 5/1986 | Sawada et al. . |
| 4,732,775 | 3/1988 | Millauer . |
| 4,879,130 | 11/1989 | Heyland et al. ............... 426/533 |

Primary Examiner—Joseph Golian
Attorney, Agent, or Firm—Vogt & O'Donnell

[57] ABSTRACT

To prepare the flavorant by a Maillard reaction, a protein hydrolysate and at least one reducing sugar are mixed with water to form a paste-like mixture which then is kneaded and heated to a plasticize it. The plasticized mixture is propelled through an extrusion unit under a pressure of from 1 bar to 100 bar and heated at a temperature of from 80° C. to 140° C. for a time sufficient to effect the Maillard reaction. The reacted mixture then is extruded into a chamber under a reduced pressure for drying and cooling it for providing the flavorant.

11 Claims, 3 Drawing Sheets

PREPARATION OF A SEASONING

CROSS-REFERENCE TO RELATED APPLICATIONS

This application is a continuation-in-part application of application Ser. No. 07/168,426, filed Mar. 15, 1988 now U.S. Pat. No. 4,879,130.

BACKGROUND OF THE INVENTION

This invention relates to a process for the production of a flavouring agent having a meat-like taste, in which a paste-like mixture which contains the essential ingredients of a protein hydrolyzate, which provides a source of free amino acids, and at least one reducing sugar and water is reacted by heating.

In the production of flavouring agents intended to taste like cooked or roasted meat, when a source of free amino acid, such as a protein hydrolyzate, is reacted with a reducing sugar, it has hitherto been customary to select and prepare the most suitable starting materials for obtaining flavours characteristic of various types of meat without any aftertaste. The reaction itself, known as the Maillard reaction, is generally carried out by heating a liquid or paste-like mixture of the appropriate ingredients to a temperature approaching the boiling temperature of water, or of the mixture, for a period of time ranging from several tens of minutes to several hours in standard reactors, such as in a double-jacketed, stirred tank reactor. The liquid or paste-like reaction product then generally is dried under mild conditions, i.e., reduced pressure and moderate temperature, so that the reaction is unable to continue for hours. This conventional process is carried out in relatively large installations over relatively long periods of time.

SUMMARY OF THE INVENTION

The object of the present invention is to provide a new process which can be carried out more quickly using a more compact installation and also to provide an apparatus for carrying out this process.

To this end, the process according to the present invention for the production of a flavouring agent is characterized in that ingredients comprising at least a protein hydrolyzate, at least one reducing sugar and water are mixed for preparing a paste-like mixture, wherein the protein hydrolyzate is in an amount of from 40 to 95% by weight, wherein the at least one reducing sugar is in an amount of from 0.5% to 10% by weight and wherein the water is in an amount sufficient such that the paste-like mixture contains water in an amount of from about 5% to about 12% by weight, each weight being based upon the weight of the mixture. The process is further characterized in that the paste-like mixture is plasticized by kneading and heating, the plasticized mixture is propelled through an extrusion unit and reacted for 30 s to 30 mins at a temperature of 80° to 140° C. under a pressure of 1 to 100 bar, and the reaction product is dried and cooled by extrusion and expansion from an extrusion unit die into a chamber under a reduced pressure of from 5 to 50 mbar.

It has thus surprisingly been found that the conventional process may be completely replaced by this new process which considerably reduces the time, energy and space required to produce flavouring agents by a Maillard reaction of a paste-like mixture based on a source of free amino acids, such as a protein hydrolyzate. It also has been found that this saving of time, energy and space is accompanied equally surprisingly by a radical improvement in the possibilities for controlling the process parameters and the characteristics of the product obtained.

Accordingly, the process according to the invention may be carried out in a simple and compact apparatus in which the operation of each element readily may be controlled directly in contrast to the inertia of, for example, a conventional mixing and heating tank.

The apparatus for carrying out the process according to the invention is characterized in that it comprises a continuous mixing unit, a continuous kneading and heating unit and an extrusion unit opening into a chamber connected to a pump.

In a first preferred embodiment of this apparatus, the continuous mixing unit comprises an Archimedian screw conveyor surmounted by a feed hopper for powder form ingredients and a feed pipe for a liquid ingredient, the continuous kneading and heating unit comprises a double-jacketed Archimedian screw conveyor and the extrusion unit comprises a pump and an extrusion die.

In a second preferred embodiment of the apparatus according to the invention, the continuous mixing unit comprises a first charging zone for dry ingredients and a second charging zone for liquid ingredients of a single-screw or twin-screw extruder while the continuous kneading and heating unit comprises at least a third kneading and heating zone of said extruder, each zone being provided with a separate double jacket.

DETAILED DESCRIPTION OF THE INVENTION

To carry out the process according to the invention, the protein hydrolyzate may be selected from particularly acidic or enzymatic hydrolyzates of materials rich in vegetable or animal proteins, such as oilseed cakes, sugar extraction residues, cereal germs, blood or offal for example, and the extracts or autolyzates of microorganisms rich in proteins, such as brewer's or baker's yeasts or certain bacteria grown on hydrocarbon based substrates, for example. Generally, it is preferred that the protein hydrolyzate has a water content of from about 1% to about 3% by weight.

One preferred embodiment of the process according to the invention is characterized by the use of, in percent by weight of said paste-like mixture, a further starting ingredient of up to 30% of a yeast extract. In this embodiment, it is possible, for example, to use a vegetable protein hydrolyzate obtained by cooking oilseed cakes with hydrochloric acid, neutralization and filtration either on its own or in combination with a yeast extract or autolyzate obtained by hydrolysis with natural yeast enzymes and separation of the insolubles.

In addition, further ingredients which may be employed to prepare said mixture may include additives which include, individually or in combination, a substance containing sulfur, other flavourings, flavour enhancers, such as spices or spice extracts, particularly extract of onion or garlic powder, and also nucleotides, particularly inosine monophosphate, or even glutamate or citric acid for example, or, finally, food quality acids or bases which may be used for possible adjustment of the pH of the paste-like mixture in case it should deviate significantly from a preferred range of approximately 4–8.

One preferred embodiment of the process according to the invention is characterized by the use of additives comprising, in % by weight of the mixture, from 0.5 to 10% of a sulfur-containing substance, from 0 to 20% of monosodium glutamate and from 0 to 5% of inosine monophosphate.

The at least one reducing sugar may be, for example, a pentose or a hexose, particularly xylose, arabinose, fructose or glucose or a mixture thereof, or even a uronic acid, particularly galaturonic acid.

The sulfur-containing substances may be selected from the group comprising, for example, cysteine, cystine, methionine, thiamine and mixtures thereof.

In addition, maltodextrin and fats may be incorporated in the paste-like mixture as further ingredients in quantities of, respectively, 0 to 40% by weight and 0 to 15% by weight, based on the weight of the mixture. The incorporation of more than 15% of fats in the mixture, on the one hand, places a premix of the dry ingredients in danger of losing its free-flow properties and, on the other hand, involves the risk of the fats separating from the reaction product on issuing from the extruder. Accordingly, since the protein hydrolyzate used in the process according to the invention generally has a water content of about 1 to 3% and since the at least one reducing sugar and additives mentioned are also dry, the quantity of water, which may be provided by means of an aqueous solution of the reducing sugar or certain additives, to be employed to obtain an amount of water sufficient to obtain paste-like mixture containing about 5 to 12% water is small and may be of the order of about 5 to 10% by weight based upon the weight of the mixture.

The operations of mixing the dry ingredients and a little water, plasticizing the paste-like mixture by kneading and heating, reacting it and extrusion of the reacted mixture into a chamber under reduced pressure advantageously may be carried out continuously and are coordinated in such way that their total duration is of the order of a few minutes to around 10 minutes. During its plasticization, the paste-like mixture changes into a smooth and homogeneous paste which is malleable when hot and which may have a viscosity of approximately 14,000 mPs at 100° C. or 3,400 mPs at 120° C. for example. By contrast, this paste is solid when cold.

The reaction itself is carried out for 30 s to 30 mins at a temperature of 80° to 140° C. under a pressure of 1 to 100 bar. At a temperature below 80° C., the reaction does not take place quickly enough to be completed in the required time. At a temperature above 140° C., the reaction may be accompanied by degradation of the components and may give a product which has a taste like that of over-roasted meat.

In a first preferred embodiment of the process according to the invention, the plasticized mixture is reacted at a temperature of 80° to 125° C. and its temperature is adjusted to 125° to 140° C. just before extrusion. In this way, the reaction may largely take place at a relatively moderate temperature, and additional heat is only applied at the last moment to enhance the effect of drying and cooling by extrusion and expansion into a chamber under reduced pressure. It is also possible in this way precisely to adjust the residual moisture content of the extruded reaction product without affecting the reaction process itself. For example, an increase in the temperature of the paste of 10° C. just before extrusion causes the vaporization of approximately 0.8% additional water during extrusion into the chamber under reduced pressure.

If the reaction takes places at a pressure towards the lower end of the indicated range of 1 to 20 bar, it is preferred to apply an increase in pressure on completion of the actual reaction in order again to enhance the drying and cooling effect by extrusion and expansion into a chamber under reduced pressure. By contrast, if the reaction takes place at a pressure situated in the middle or at the upper end of the indicated range, this also will be sufficient to obtain an adequate drying and cooling effect. Finally, if the reaction takes place at a pressure above 20 bar, this may mean that the plasticized paste-like mixture might not move sufficiently quickly and is in danger of burning.

During the drying and cooling operation, it is possible, on the one hand, to eliminate all the water added to the paste, namely around 5 to 10% water, and, on the other hand, to cool the reaction product to a sufficiently low temperature for the reaction to stop. During extrusion, the strand of paste entering the chamber under reduced pressure swells or expands considerably under the effect of the vaporization of the added water which it contains and the expansion of that water vapour. By escaping from the paste which it has caused to expand, this water vapour removes the latent heat of vaporization which is reflected in a sudden cooling of the expanded strand. The temperature thus falls from 125° to 140° C. to 50° to 60° C., for example.

A reduced pressure of 5 to 50 mbar is thus maintained in the chamber into which the paste is extruded. Maintaining a pressure below 5 mbar involves an unnecessarily high energy consumption and involves the risk of blockage of the extrusion process by excessive expansion of the paste commencing prematurely in the extrusion die. Maintaining a pressure above 50 mbar, such as 60 to 80 mbar for example, may give rise to problems due to the fact that the strand does not cool sufficiently, remains thermoplastic, does not expand sufficiently and dries less effectively. The process according to the invention enables, in effect, an expanded, extruded reaction product having a residual moisture content of from about 1 to 3% to be obtained. An increase in the pressure prevailing in the chamber of 10 mbar beyond the range indicated may produce an increase of around 0.3% in the residual moisture content.

The expanded, extruded reaction product may have an apparent density of approximately 100 to 200 g/l. However, the product is preferably ground into a powder or granulate having an apparent density of approximately 450 to 750 g/l. This apparent density may be adjusted not only by the fineness of grinding, particularly through the mesh width of the grid of a hammer mill for example, but also by the pressure maintained in the chamber. Thus, where grinding is carried out in a hammer mill having a 2 mm mesh grid, the apparent density of the powder may be varied from 460 to 600 g/l by varying the pressure in the chamber from 15 to 50 mbar, for example.

The apparatus for carrying out the process according to the invention comprises a continuous mixing unit, a continuous kneading and heating unit and an extrusion unit opening into a chamber connected to a pump. As mentioned above, this apparatus may be constructed in different ways which may be grouped into two principal preferred embodiments distinguished primarily by the fact of whether the continuous kneading and heating unit is or is not itself capable of providing the pressure required at least for the extrusion step.

In the first preferred embodiment presented above, therefore, the apparatus comprises to Archimedian screw conveyors followed by a pump preceding the extrusion die while, in the second preferred embodiment presented above, the apparatus comprises a single-screw or twin-screw extruder comprising several successive zones each provided with a separate double jacket.

In this second preferred embodiment, the extrusion unit may be formed by the front part of the extruder itself, i.e., may comprise at least a last independent double-jacketed zone and an extrusion die of the extruder. However, it also may comprise additional elements enabling the reaction temperature to be dissociated from the extrusion temperature.

The extrusion unit thus may comprise at least a last zone of the extruder surrounded by a separate double jacket, at least one heating tube connected to the extruder and surrounded by a double jacket and an extrusion die connected to the heating tube. The heating tube preferably is filled with geometric static mixing elements intended to mix the flux of paste to improve the speed and uniformity of heat transfer and to prevent the paste from stopping at dead points of the tube.

In this embodiment of the apparatus, where the extrusion unit is extended beyond the extruder, the continuous kneading and heating unit may additionally comprise a double-jacketed dwell tube between the extruder and the heating tube. This dwell tube is also preferably filled with geometric static mixing elements. Its diameter is preferably large enough for the mean axial speed of the paste therein to be similar to the mean axial speed of the paste in the extruder.

The introduction of geometric static mixing elements into the dwell tube and the heating tube and even into the extrusion die itself is undoubtedly capable of producing significant pressure losses, i.e., of absorbing a large proportion of the pressure generated by the pump or by the extruder. This effect may be particularly marked in the heating tube of which the diameter is preferably fairly small to ensure rapid heat transfer. In order at least partly to counteract this effect, the heating tube may with advantage be divided into several parts and these parts connected in parallel.

The apparatus for carrying out the process according to the invention is described in detail hereinafter with reference to the accompanying drawings:

DETAILED DESCRIPTION OF THE DRAWINGS

Figure 1:
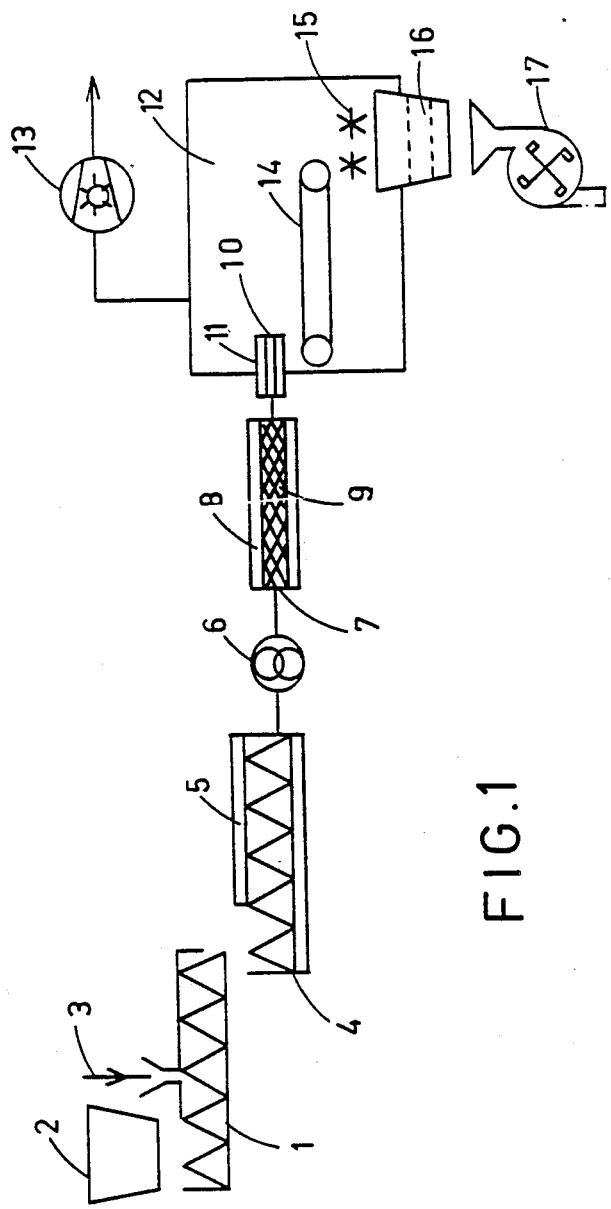
FIG. 1 diagrammatically illustrates a first embodiment of the apparatus.

The apparatus shown in FIG. 1 comprises a continuous mixing unit 1–3, a continuous kneading and heating unit 4, 5 and an extrusion unit 6–11 opening into a chamber 12 connected to a pump 13.

The continuous mixing unit comprises an Archimedian screw conveyor 1 surmounted by a feed hopper 2 for powder-form ingredients and a feed pipe 3 for a liquid ingredient.

The continuous kneading and heating unit comprises an Archimedian screw conveyor 4 surrounded by a double jacket 5 heatable by the circulation of hot oil.

The extrusion unit comprises a positive pump 6, a heating tube 7 surrounded by a double jacket 8 filled with geometric static mixing elements 9, in the form of metal spiders overlapping one another, and a die 10 consisting of short cylindrical tube segment surrounded by a double jacket 11.

The chamber 12 is connected to a pump in the form of a vane pump 13. It encloses the downstream end of the die 11, a conveyor belt 14 and a precrusher 15. It communicates with the outside through an airlock 15 which opens onto a hammer mill 17.

Figure 2:
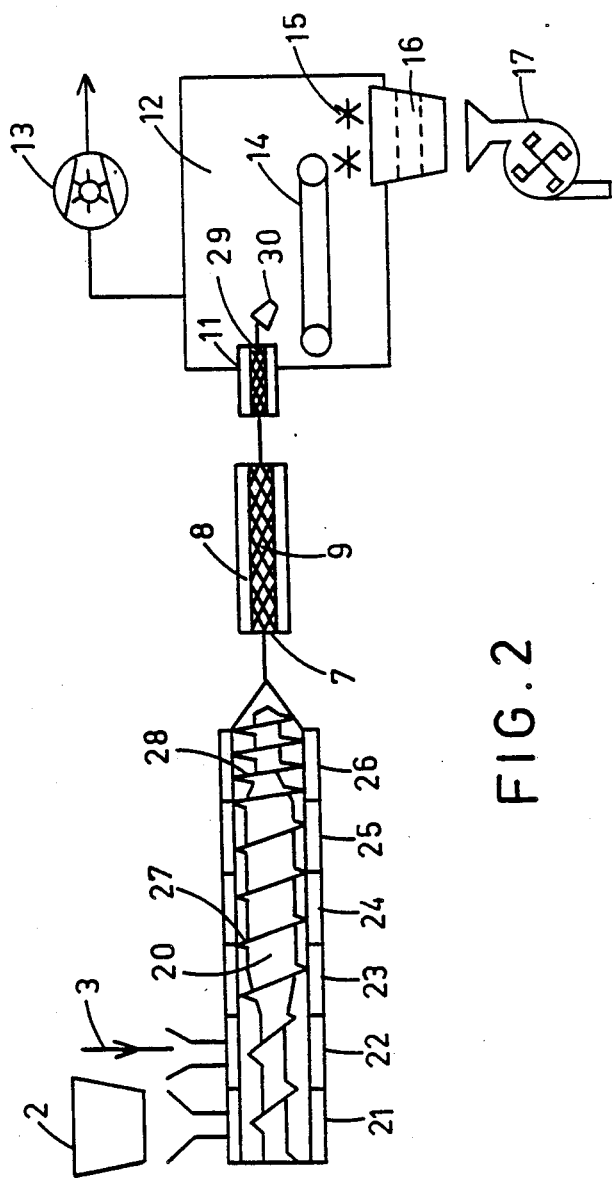
FIG. 2 diagrammatically illustrates a second embodiment of the apparatus.

In the apparatus shown in FIG. 2, the continuous mixing unit comprises a twin-screw extruder having six zones each provided with a separate double jacket, the first zone 21 being for charging dry ingredients and the second zone 22 for charging a liquid ingredient. In these first two zones, the flights of the screws 20 are widely spaced and are arranged to compound the mixture and to advance it through the extruder.

The continuous kneading and heating unit comprises the third, fourth and fifth zones 23, 24 and 25 of the extruder in which the flights 27 of the screws are closer together and overlap more closely. In the last zone 26 of the extruder the flights 28 of the screws are spaced even closer together to apply a thrust or pressure to the paste. The unit also comprises a heating tube 7 connected to the extruder which is filled with geometric static mixing elements 9 and surrounded by a double jacket 8, and an extrusion die formed by a short cylindrical tube section surrounded by a double jacket 11 filled with geometric static mixing elements 29 and terminating in a removable nozzle 30 inclined towards a conveyor belt 14 in the chamber 12.

In this second embodiment of the apparatus according to the invention, the chamber 12 again is connected to a pump in the form of a vane pump 13. It also encloses the downstream end of the die 11, the conveyor belt 14 and a precrusher 15. It communicates with the outside through an airlock 16 opening onto a hammer mill 17.

Figure 3:
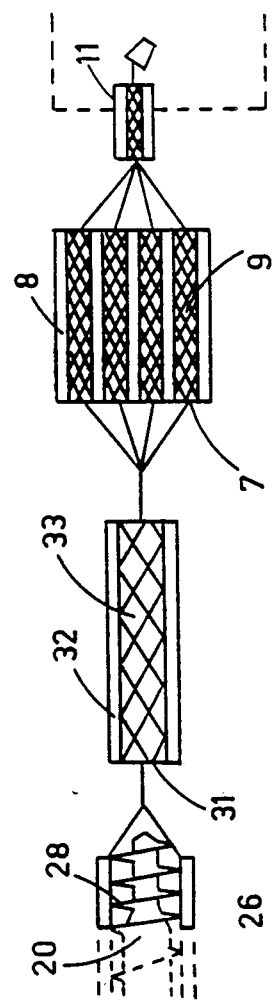
FIG. 3 diagrammatically illustrates part of a variant of the embodiment of the apparatus shown in FIG. 2.

In the variant shown in FIG. 3, the continuous kneading and heating unit of the embodiment of the apparatus shown in FIG. 2 additionally comprises a dwell tube 31 which is connected between the extruder and the heating tube and which is filled with geometric static mixing elements 33 in the form of intertwined metal spiders and is surrounded by a double jacket 32.

In this variant, the heating tube 7 is formed by four parallel segments each filled with geometric static mixing elements 9 and surrounded by a common double jacket 8.

EXAMPLES

The process according to the invention is illustrated by the following Examples in which percentages are by weight.

EXAMPLE 1

A vegetable protein hydrolyzate is prepared by cooking ground nut cake with hydrochloric acid, neutralization, filtration, partial decoloration and drying to a residual water content of 2%. Using an apparatus of the type described above with reference to FIG. 1 of the accompanying drawings, a dry mixture comprising 82% of this vegetable protein hydrolyzate, 4.5% chicken fat, 0.5% glucose, 3% cysteine and 5% inosine monophosphate is continuously prepared in a first conveyor with twin Archimedian screws. 5% water is then added to obtain 100% of a paste-like mixture.

The paste-like mixture is continuously introduced into a second conveyor with twin Archimedian screws surrounded by a double jacket in which hot oil circulates. In this second conveyor, the mixture is plasticized by kneading and heating to form a paste which is heated to and then kept at a temperature of 120° C. under 1 bar for 2 mins.

By means of a volumetric pump applying a pressure of 10 bar to the paste delivered by the second conveyor, the paste is propelled through a heating tube surrounded by a double jacket filled with geometric static mixing elements in the form of intertwined metal spiders. The temperature of the paste then is increased to 125° C. and the paste is extruded immediately through a die with a cylindrical orifice 5 mm in diameter surrounded by a double jacket and also kept at 125° C. The die opens into a chamber kept under a pressure of 10 mbar. The strand of extruded paste expands considerably and cools suddenly under the effect of the vaporization of the added water which it contains and the expansion of that water vapour.

The extruded paste strand thus is dried to a residual water content of approximately 2% and is cooled to approximately 50° C., at which temperature the so-called Maillard reaction is virtually terminated. The expanded strand has a diameter of approximately 80 mm and an apparent density of 120 g/l. It is collected on a conveyor belt inside the chamber and carried to a precrusher comprising rotating rakes before leaving the chamber through an airlock. It is then crushed in a hammer mill equipped with a 2 mm mesh grid.

A flavouring agent thus is obtained in the form of a golden, free-flowing powder which has an apparent density of 450 g/l and which is capable of giving a soup or a sauce a roast chicken flavour.

EXAMPLE 2

Using an apparatus of the type described above with reference to FIG. 2 of the accompanying drawings, 10 kg/h of a dry mixture comprising 53% of a non-decolored acid hydrolyzate of ground nut cake containing 2% water, 26% of yeast extract containing 2% water, 6% of monosodium glutamate, 1.3% of sodium chloride and 1.2% of thiamine continuously is introduced into a first zone for charging dry ingredients in a twin-screw extruder.

The extruder comprises six zones 16 cm in length surrounded by separate double jackets and two screws having an external diameter of 37 mm and an internal diameter of 22 mm. Its free volume is approximately 1 l. The screws are rotated at 40 r.p.m.

12.5% of a glucose syrup containing 20% dry matter are continuously introduced into a second zone of the extruder for charging a liquid ingredient. 100% of a paste-like mixture as obtained and plasticized by kneading and heating then is reacted in the third, fourth and fifth zones of the extruder. The paste obtained is then kept at a temperature of approximately 100° C. for 3 mins under 1.3 bar.

In the sixth zone of the extruder where the flights of the screws are much closer together, a pressure is applied to the paste so that it is able to pass through a heating tube consisting of four parallel cylindrical segments 450 mm in length with an internal diameter of 10 mm filled with geometric static mixing elements and surrounded by a common double jacket while retaining enough energy to lend itself to the subsequent operation of drying and cooling by extrusion.

In this heating tube, the temperature of the paste is rapidly increased to 118° C. This temperature is then increased to 125° C. in the extrusion die following the heating tube. The extrusion die itself consists of a cylindrical tube section 500 mm in length with an internal diameter of 8 mm which is surrounded by a double jacket, filled with geometric static mixing elements and terminated by a downwardly inclined, removable nozzle with an internal diameter of 5 mm.

The paste thus is extruded towards a conveyor belt situated below the downstream end of the die in a chamber kept under a pressure of 15 mbar. The extruded strand undergoes instantaneous expansion, drying and cooling through vaporization and expansion of the added water which it contains as it enters the chamber under reduced pressure. It thus is dried to a residual moisture content of approximately 2.5% and at the same time cooled to around 50°-60° C., at which temperature the so-called Maillard reaction has virtually stopped.

The extruded strand solidifies rapidly during its transport in the chamber and may be precrushed by means of rotating rakes before leaving the chamber through an airlock. The precrushed strand has an apparent density of 150 g/l. It is then crushed in a hammer mill equipped with a 2 mm mesh grid.

A flavouring agent thus is obtained in the form of a free-flowing brown powder which has an apparent density of 500 g/l and which is capable of giving a soup or a sauce a flavour of cooked beef.

EXAMPLE 3

The procedure is as described in Example 2 except that 50 kg of starting material/h are introduced into the extruder. To ensure that the reaction time stays at around 3 minutes in spite of the considerable increase in the throughput of the extruder, the screws are rotated at 200 r.p.m. and the reaction is extended beyond the extruder in a double-jacketed dwell tube. This tube, which is connected between the extruder and the heating tube, has a length of 1 m and a diameter of 36 mm. It is filled with geometric static mixing elements in the form of intertwined metal spiders overlapping one another.

A flavouring agent entirely comparable with that of Example 2 is obtained.

We claim:
1. A process for preparing a flavoring agent comprising:
   mixing ingredients comprising at least a protein hydrolyzate, at least one reducing sugar and water for forming a paste-like mixture, wherein the protein hydrolyzate is in an amount of from 40% to 95% by weight, the at least one reducing sugar is in an amount of from 0.5% to 10% by weight and the water is in an amount such that the water content of the mixture is from about 5% to about 12% by weight, each weight being based upon the weight of the mixture;
   kneading and heating the paste-like mixture for plasticizing it;
   propelling the plasticized mixture through an extrusion unit under a pressure of from 1 bar to 100 bar while heating the plasticized mixture at a tempera- ture of from 80° C. to 140° C. for from 30 secs to 30 mins for reacting the mixture; and extruding the reacted mixture through an extrusion die into a chamber having a reduced pressure of from 5 mbar to 50 mbar for drying and cooling the reacted mixture for providing a flavorant.

2. A process according to claim 1 wherein the plasticized mixture is reacted by first heating the mixture at a temperature of from 80° C. to 125° C. and then at a temperature of from 125° C. to 140° C.

3. A process according to claim 1 wherein the plasticized mixture is reacted under a pressure of first from 1 bar to 20 bar and then the pressure is increased prior to extruding the reacted mixture.

4. A process according to claim 2 wherein the plasticized mixture is reacted under a pressure of first from 1 bar to 20 bar and then while being heated at the temperature of from 125° C. to 140° C., the pressure is increased.

5. A process according to claim 1 further comprising mixing up to 30% by weight of yeast extract with the ingredients based on the weight of the mixture.

6. A process according to claim 1 further comprising mixing up to 40% by weight of maltodextrin with the ingredients based on the weight of the mixture.

7. A process according to claim 1 further comprising mixing up to 15% by weight of fats with the ingredients based upon the weight of the mixture.

8. A process according to claim 1 further comprising mixing additives selected from a group consisting of sulfur-containing substances, flavorings, flavor enhancers and nucleotides and combinations thereof with the ingredients.

9. A process according to claim 1 further comprising mixing additives selected from a group consisting of from 0.5% to 10% by weight of a sulfur-containing substance, up to 20% by weight of monosodium glutamate and up to 5% by weight of isosine monophosphate and combinations thereof with the ingredients, each weight being based upon the weight of the mixture with the ingredients.

10. A process according to claim 1 wherein the at least one reducing sugar is in an aqueous solution when mixed with the protein hydrolyzate.

11. A process according to claim 1 further comprising grinding the dried and cooled flavorant for obtaining particulate material having an apparent density of from 450 g/l to 750 g/l.

* * * * *